United States Patent [19]
Okuda et al.

[11] Patent Number: 6,039,666
[45] Date of Patent: Mar. 21, 2000

[54] HYDRAULIC AND MECHANICAL TRANSMISSION APPARATUS

[75] Inventors: Akihito Okuda; Koichi Fushimi; Hiroshi Terayama, all of Saitama, Japan

[73] Assignee: Honda Giken Kogyo Kabushiki Kaisha, Tokyo, Japan

[21] Appl. No.: 09/008,351

[22] Filed: Jan. 16, 1998

[30] Foreign Application Priority Data

Jan. 21, 1997  [JP]  Japan ................................. 9-008969

[51] Int. Cl.⁷ ............................................. F16H 47/04
[52] U.S. Cl. ............................... 475/72; 475/75; 475/80; 475/82; 60/488
[58] Field of Search ............................. 475/72, 74, 75, 475/80, 81, 82; 60/488

[56] References Cited

U.S. PATENT DOCUMENTS

| | | | |
|---|---|---|---|
| 3,184,913 | 5/1965 | Anderson et al. | 475/75 X |
| 3,709,060 | 1/1973 | Orshansky | 475/82 |
| 3,709,061 | 1/1973 | Orshansky | 475/80 |
| 3,733,924 | 5/1973 | Zentz et al. | 475/72 X |
| 4,024,775 | 5/1977 | Anderson et al. | 475/80 X |
| 4,446,756 | 5/1984 | Hagin et al. | 475/75 |
| 4,491,034 | 1/1985 | Fredriksen | 475/80 |
| 4,843,907 | 7/1989 | Hagin et al. | 475/80 |
| 4,922,717 | 5/1990 | Furumoto et al. | 60/488 X |
| 4,972,675 | 11/1990 | Kawahara et al. | 60/488 |
| 4,983,149 | 1/1991 | Kita | 475/82 X |
| 5,542,307 | 8/1996 | Hasegawa et al. | 74/730.1 X |
| 5,544,547 | 8/1996 | Ishimaru | 74/730.1 |
| 5,584,772 | 12/1996 | Hayd | 475/72 |
| 5,643,122 | 7/1997 | Fredriksen | 475/80 |
| 5,766,107 | 6/1998 | Englisch | 475/80 |
| 5,785,623 | 7/1998 | Lino et al. | 475/72 |
| 5,803,856 | 9/1998 | Lino et al. | 475/72 |

FOREIGN PATENT DOCUMENTS

| | | |
|---|---|---|
| 0699850 | 3/1996 | European Pat. Off. |
| 63-83457 | 4/1988 | Japan . |

*Primary Examiner*—Charles A. Marmor
*Assistant Examiner*—Scott Lund
*Attorney, Agent, or Firm*—Armstrong Westerman, Hattori, McLeland & Naughton

[57] ABSTRACT

A power of an input shaft driven by an engine is divided by a power dividing device and transmitted to first and second output shafts and a hydraulic pump of a hydrostatic continuously variable transmission is driven by the first output shaft, whereas a hydraulic motor is driven by the second output shaft through a mechanical transmission device and also by the hydraulic pump. A main oil pump is provided at the input shaft which rotates at the same speed as an engine speed, and a subsidiary oil pump is provided at the first output shaft which decreases rotational speed thereof to zero with an increase in the engine rotational speed. In a low rotational speed region of the engine, oil is supplied by both the main oil pump and the subsidiary oil pump, whereas in a high rotational speed region of the engine, oil is supplied by only the main oil pump. With this construction, it is possible to prevent a waste of energy required to drive the oil pump in the high rotational speed region of the engine while ensuring the quantity of oil supply from the oil pump in the low rotational speed region of the engine.

4 Claims, 9 Drawing Sheets

REVERSE ← • → FORWARD

→ TOTAL SPEED RATIO e $$e = \frac{\text{ROTATIONAL SPEED OF DIFFERENTIAL CASE 22}}{\text{ROTATIONAL SPEED OF INPUT SHAFT 9}}$$

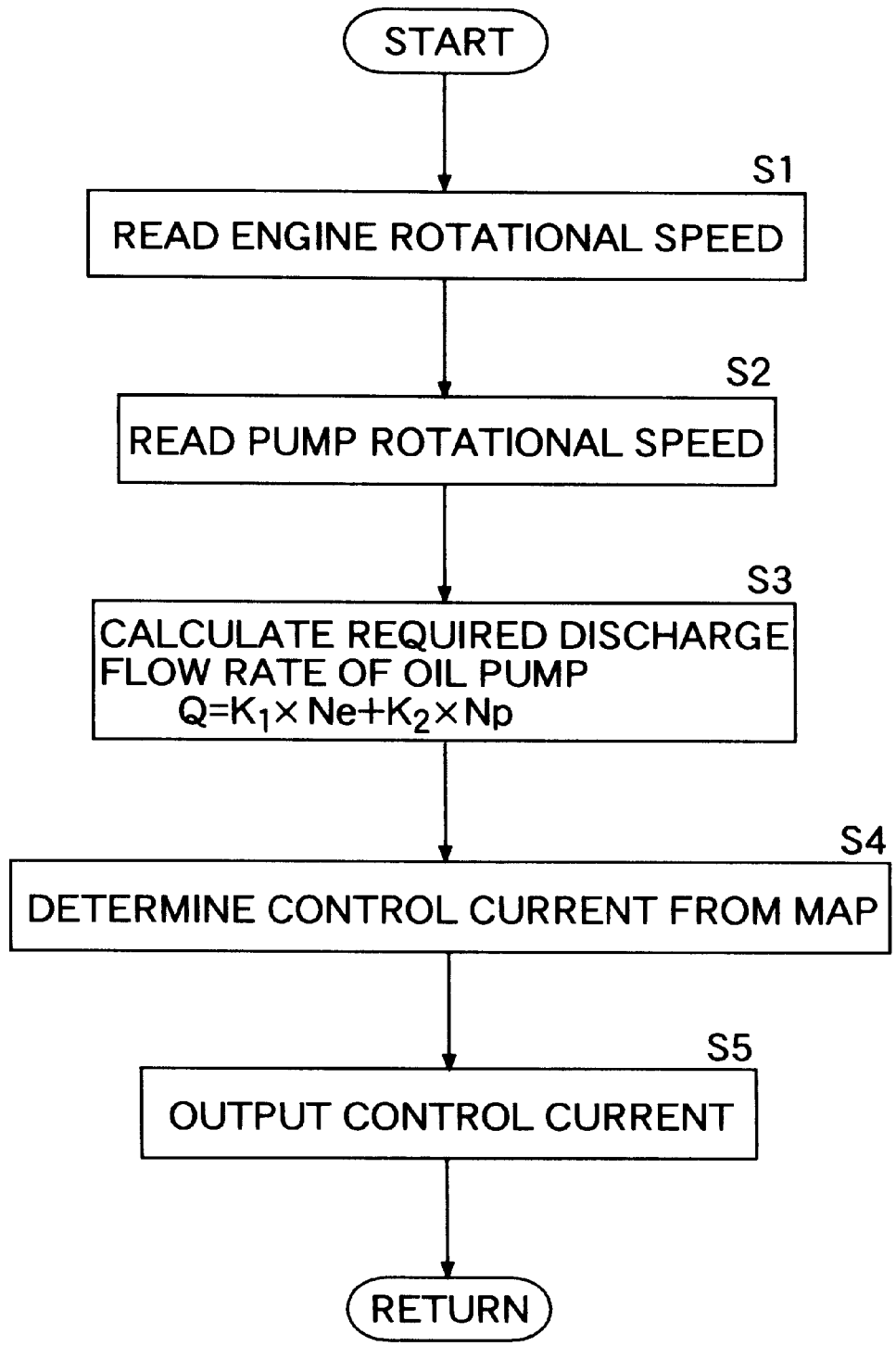

HYDRAULIC AND MECHANICAL TRANSMISSION APPARATUS

BACKGROUND OF THE INVENTION

1. Field of the Invention

The present invention relates to a hydraulic and mechanical transmission apparatus arranged to achieve variable transmission of the power of a prime mover by means of cooperation between a hydrostatic continuously variable transmission having superior continuously variable transmission characteristics and a mechanical transmission device having superior transmission efficiency.

2. Description of the Related Art

A hydrostatic continuously variable transmission is already known from Japanese patent application Laid-open No. 63-83457. In the hydrostatic continuously variable transmission, a hydraulic pump and a hydraulic motor, at least either one of which is constructed as a variable displacement construction, are connected together by a hydraulic closed circuit, and an oil pump for supplementing the oil in the hydraulic closed circuit is driven by an input shaft which is a rotating shaft of the hydraulic pump.

However, in the above-described conventional hydrostatic continuously variable transmission, the oil pump is driven by a rotating shaft of the hydraulic pump which rotates at the same speed as the crankshaft of an engine, and therefore, if a sufficient discharge flow rate of oil is to be ensured in a low rotational speed region of the engine, it is necessary to increase the capacity of the oil pump. However, since the oil pump discharges oil in an amount proportional to its rotational speed, if the capacity of the oil pump is increased, the discharge flow rate of oil greatly exceeds the required amount in a high rotational speed region of the engine, and the driving force of the engine is wastefully consumed by that amount.

SUMMARY OF THE INVENTION

The present invention was made in view of the above-described problem, and an object of the present invention is to achieve a reduction in energy consumption in a hydraulic and mechanical transmission apparatus by preventing the discharge flow rate of oil from excessively increasing in a high rotational speed region of a prime mover while ensuring a sufficient discharge flow rate of oil in a low rotational speed region of the prime mover.

To achieve the above object, according to a first feature of the present invention, there is provided a hydraulic and mechanical transmission apparatus comprising an input shaft, a first output shaft, a second output shaft, a power dividing device for dividing power inputted from a prime mover to the input shaft into portions and transmitting the respective portions to the first and second output shafts, a hydrostatic continuously variable transmission including a hydraulic pump driven by power outputted from the first output shaft, a hydraulic motor which communicates with the hydraulic pump through a hydraulic closed circuit, and a control panel in which the hydraulic closed circuit is formed, where at least either one of the hydraulic pump and the hydraulic motor has a variable displacement construction, a mechanical transmission device is connected to the second output shaft, a power collecting shaft collects power respectively outputted from the mechanical transmission device and the hydraulic motor and supplies the collected power to a load, and an oil supplying means is operable for providing a supplement of oil in at least the hydraulic closed circuit. The hydraulic and mechanical transmission apparatus has a characteristic which allows a rotational speed of the first output shaft and a rotational speed of the second output shaft to decrease and increase, respectively, along with an increase in a rotational speed of the input shaft. The oil supplying means includes a main oil pump driven at a rotational speed proportional to the rotational speed of the input shaft and a subsidiary oil pump driven at a rotational speed proportional to the rotational speed of the first output shaft.

In the above-described construction, the oil supplying means includes the main oil pump driven at a rotational speed proportional to the rotational speed of the input shaft and the subsidiary oil pump driven at a rotational speed proportional to the rotational speed of the first output shaft. Accordingly, in a region in which the rotational speed of the prime mover is low, even if the rotational speed of the input shaft is low and hence, the discharge flow rate of the main oil pump is low, the discharge flow rate of the subsidiary oil pump becomes large because the rotational speed of the first output shaft is high, so that the required discharge flow rate can be ensured as a whole. In a region in which the rotational speed of the prime mover is high, a sufficient discharge flow rate can be ensured by the main oil pump because the rotational speed of the input shaft is high, and moreover, the rotational speed of the first output shaft becomes low such that the wasteful energy consumption of the subsidiary oil pump can be suppressed.

According to a second feature of the present invention, there is provided a hydraulic and mechanical transmission apparatus comprising an input shaft, a first output shaft, a second output shaft, a power dividing device for dividing power inputted from a prime mover to the input shaft into portions and transmitting the respective portions to the first and second output shafts, a hydrostatic continuously variable transmission including a hydraulic pump driven by power outputted from the first output shaft, a hydraulic motor which communicates with the hydraulic pump through a hydraulic closed circuit, and a control panel in which the hydraulic closed circuit is formed, where at least either one of the hydraulic pump and the hydraulic motor is being constructed as a variable displacement type, a mechanical transmission device is connected to the second output shaft, a power collecting shaft collects power respectively outputted from the mechanical transmission device and the hydraulic motor and supplies the collected power to a load, and an oil supplying means is responsible for providing a supplement of oil in at least the hydraulic closed circuit. The hydraulic and mechanical transmission apparatus has a characteristic which allows a rotational speed of the first output shaft and a rotational speed of the second output shaft to decrease and increase, respectively, along with an increase in a rotational speed of the input shaft. The oil supplying means includes a main oil pump driven at a rotational speed proportional to the rotational speed of the second output shaft and a subsidiary oil pump driven at a rotational speed proportional to the rotational speed of the first output shaft.

In the above-described construction, the oil supplying means includes the main oil pump driven at a rotational speed proportional to the rotational speed of the second output shaft and the subsidiary oil pump driven at a rotational speed proportional to the rotational speed of the first output shaft. Accordingly, in a region in which the rotational speed of the prime mover is low, even if the rotational speed of the second output shaft is low and hence, the discharge flow rate of the main oil pump is low, the discharge flow rate of the subsidiary oil pump becomes large because the rotational speed of the first output shaft is high, so that the required discharge flow rate can be ensured as a whole. In a region in which the rotational speed of the prime mover is high, a sufficient discharge flow rate can be ensured by the main oil pump because the rotational speed of the second output shaft is high, and moreover, the rotational speed of the first output shaft becomes low so that the wasteful energy consumption of the subsidiary oil pump can be suppressed.

According to a third feature of the present invention, there is provided a hydraulic and mechanical transmission apparatus comprising an input shaft, a first output shaft, a second output shaft, a power dividing device for dividing power inputted from a prime mover to the input shaft into portions and transmitting the respective portions to the first and second output shafts, a hydrostatic continuously variable transmission including a hydraulic pump driven by power outputted from the first output shaft, a hydraulic motor which communicates with the hydraulic pump through a hydraulic closed circuit, and a control panel in which the hydraulic closed circuit is formed, where at least either one of the hydraulic pump and the hydraulic motor is constructed as a variable displacement type, a mechanical transmission device is connected to the second output shaft, a power collecting shaft collects power respectively outputted from the mechanical transmission device and the hydraulic motor and supplies the collected power to a load, and oil supplying means for providing a supplement of oil in at least the hydraulic closed circuit, the hydraulic and mechanical transmission apparatus having a characteristic which allows a rotational speed of the first output shaft and a rotational speed of the second output shaft to decrease and increase, respectively, along with an increase in a rotational speed of the input shaft. The oil supplying means includes a variable displacement oil pump driven at a rotational speed proportional to the rotational speed of the input shaft, first rotational speed detecting means for detecting the rotational speed of the input shaft, second rotational speed detecting means for detecting the rotational speed of the first output shaft, and control means for controlling a discharge flow rate of the variable displacement oil pump to make the discharge flow rate proportional to the rotational speed of the input shaft and the rotational speed of the first output shaft.

In the above-described construction, the oil supplying means includes the variable displacement oil pump driven at a rotational speed proportional to the rotational speed of the input shaft, the first rotational speed detecting means for detecting the rotational speed of the input shaft, the second rotational speed detecting means for detecting the rotational speed of the first output shaft, and the control means for controlling the discharge flow rate of the variable displacement oil pump to make the discharge flow rate proportional to the rotational speed of the input shaft and the rotational speed of the first output shaft. Accordingly, in a region in which the rotational speed of the prime mover is low, even if the rotational speed of the input shaft is low, the required discharge flow rate of the variable displacement oil pump can be ensured because the rotational speed of the first output shaft is high. In a region in which the rotational speed of the prime mover is high, even if the rotational speed of the input shaft is high, an excessive increase in the discharge flow rate of the variable displacement oil pump can be prevented because the rotational speed of the first output shaft is low, whereby the wasteful energy consumption of the subsidiary oil pump can be suppressed.

The above and other objects, features and advantages of the present invention will become apparent from the following detailed description of preferred embodiments taken in conjunction with the accompanying drawings.

BRIEF DESCRIPTION OF THE DRAWINGS

FIGS. 1 to 4 illustrate a first embodiment of the present invention, wherein:

FIG. 1 is a skeleton view of a hydraulic and mechanical transmission apparatus for a vehicle;

FIG. 2 is a diagram showing the relationship between the swashplate angles of a hydrostatic continuously variable transmission and a total speed ratio in the hydraulic and mechanical transmission apparatus;

FIG. 3 is a graph showing variation characteristics of engine rotational speed and pump rotational speed with respect to a variation in vehicle speed; and FIG. 4 is a graph showing variation characteristics of discharge flow rates of a main oil pump and a subsidiary oil pump with respect to a variation in vehicle speed.

FIGS. 5 to 7 illustrate a second embodiment of the present invention, wherein:

FIG. 5 is a developed skeleton view of a hydraulic and mechanical transmission apparatus for a vehicle;

FIG. 6 is a graph showing variation characteristics of motor rotational speed and pump rotational speed with respect to a variation in vehicle speed; and FIG. 7 is a graph showing variation characteristics of discharge flow rates of a main oil pump and a subsidiary oil pump with respect to a variation in vehicle speed.

FIGS. 8 and 9 illustrate a third embodiment of the present invention, wherein:

FIG. 8 is a developed skeleton view of a hydraulic and mechanical transmission apparatus for a vehicle; and FIG. 9 is a flowchart illustrating the operation of the third embodiment.

DESCRIPTION OF THE PREFERRED EMBODIMENTS

A first embodiment of the present invention will be described below with reference to FIGS. 1 to 4.

Figure 1:
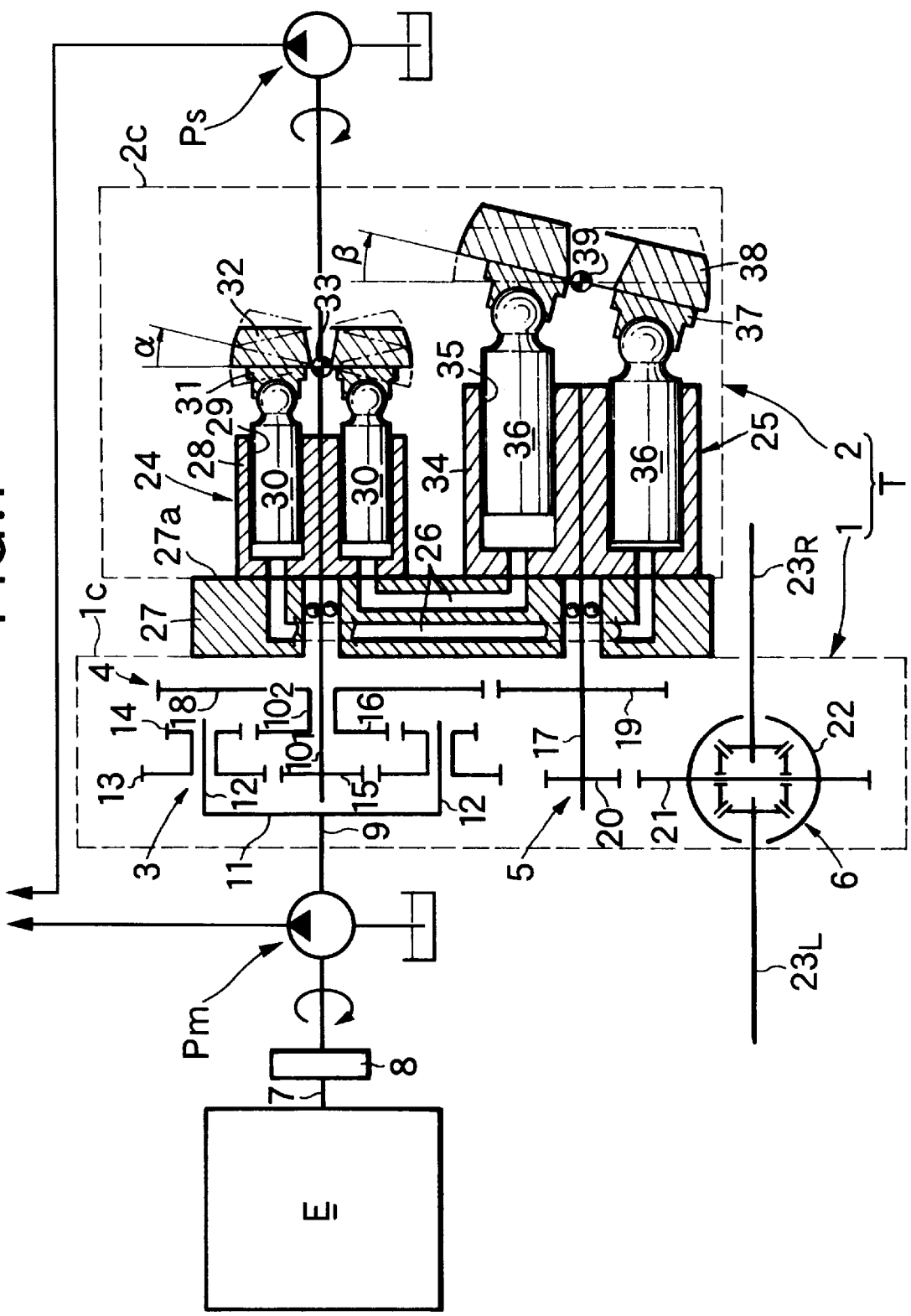

In FIG. 1, symbol T denotes a hydraulic and mechanical transmission apparatus for a vehicle of a front engine and front drive type or a rear engine and rear drive type. This hydraulic and mechanical transmission apparatus T includes a mechanical transmission unit 1 and a hydrostatic continuously variable transmission 2, and an engine E which serves as a prime mover is disposed on one side of the mechanical transmission unit 1 and the hydrostatic continuously variable transmission 2 is disposed on the other side of the same in such a manner that the mechanical transmission unit 1 is sandwiched between the engine E and the hydrostatic continuously variable transmission 2.

The mechanical transmission unit 1 includes a power dividing device 3, a mechanical transmission device 4, a power collecting shaft 17, a reduction device 5 and a differential 6, all of which are contained in a common first casing 1c.

The power dividing device 3 is constructed as a planetary gear, and is provided with an input shaft 9 connected to a crank shaft 7 of the engine E through a torque damper 8, a first output shaft $10_1$ arranged coaxially with the input shaft 9, and a second output shaft $10_2$ concentrically surrounding the first output shaft $10_1$. Fixed to the input shaft 9 is a carrier 11 which has a plurality of pinion shafts 12 parallel to the input shaft 9 around its outer periphery. A pair of larger- and smaller-diameter pinion gears 13 and 14 which are integrally joined to each other are rotatably supported on the respective pinion shafts 12. A smaller-diameter sun gear 15 meshed with the larger-diameter pinion gear 13 is fixed to the first output shaft $10_1$, while a larger-diameter sun gear 16 meshed with the smaller-diameter pinion gear 14 is fixed to the second output shaft $10_2$.

The mechanical transmission device 4 includes a gear 18 fixed to the second output shaft $10_2$, and a gear 19 fixed to the power collecting shaft 17 and meshed with the gear 18. The power collecting shaft 17 is disposed in parallel with the first and second output shafts $10_1$ and $10_2$.

The reduction device 5 includes a smaller-diameter gear 20 fixed to the power collecting shaft 17, and a larger-diameter gear 21 fixed to a differential case 22 of the differential 6 and meshed with the gear 20.

The differential 6 is of a conventional known type which is adapted to distribute a power transmitted from the larger-diameter gear 21 to the differential case 22 to left and right wheel drive axles $23_L$ and $23_R$ supported by the differential case 22. The differential 6 is disposed in parallel with the power collecting shaft 17 so that either one of the left and right wheel drive axles $23_L$ and $23_R$ passes the outer periphery of the hydrostatic continuously variable transmission 2, in the shown example, the lower side of the outer periphery.

The hydrostatic continuously variable transmission 2 includes a hydraulic pump 24, a hydraulic motor 25 and a control panel 27 in which is formed a hydraulic closed circuit 26 which places the hydraulic pump 24 and the hydraulic motor 25 in communication with each other. The control panel 27 is fixed to one side of the first casing 1c adjacently to the mechanical transmission unit 1, and rotatably supports the first output shaft $10_1$ and the power collecting shaft 17. Therefore, the control panel 27 is disposed between the mechanical transmission unit 1 and the hydraulic pump 24 as well as the hydraulic motor 25.

The hydraulic pump 24 has a variable displacement construction, and is provided with a pump cylinder 28 connected to the first output shaft $10_1$ on a coaxial axis and disposed for sliding rotation on a hydraulic distributing surface 27a of the control panel 27, a multiplicity of pump plungers 30 slidably supported in a multiplicity of annularly-arranged cylinder bores 29 which are defined in the pump cylinder 28 to surround the axis thereof, and variable-angle pump swashplates 32 against which shoes 31 slidably abut, the shoes 31 being pivotally provided at tip ends of the respective pump plungers 30. Specifically, each of the pump swashplates 32 is capable of rotating about a trunnion axis 33 which crosses an axis of the pump cylinder 28 at right angles, between a standing position perpendicular to the axis and a predetermined maximum tilted position which is tilted with respect to the axis, and if a tilt angle $\alpha$ from the standing position of each of the pump swashplates 32 is increased, it is possible to increase the reciprocation stroke of each of the pump plungers 30.

The hydraulic motor 25 is also constructed as a variable displacement type, and is provided with a motor cylinder 34 connected to the power collecting shaft 17 on a coaxial axis and disposed for sliding rotation on the hydraulic distributing surface 27a of the control panel 27, a multiplicity of motor plungers 36 slidably fitted in a multiplicity of cylinder bores 35 which are defined in the motor cylinder 34 to surround the axis thereof, and motor swashplates 38 against which shoes 37 slidably abut, the shoes 37 being pivotally provided at tip ends of the respective motor plungers 36. Specifically, each of the motor swashplates 38 is capable of rotating about a trunnion axis 39 which crosses an axis of the motor cylinder 34 at right angles, between a standing position which is perpendicular to the axis and a predetermined maximum tilted position which is tilted with respect to the axis, and if a tilt angle $\beta$ from the standing position of each of the motor swashplates 38 is increased, it is possible to increase the reciprocation stroke of each of the motor plungers 36.

A second casing 2c which contains the hydraulic pump 24 and the hydraulic motor 25 is fixed to the control panel 27 and the first casing 1c.

The input shaft 9 is provided with a main oil pump Pm driven directly by the input shaft 9, and the first output shaft $10_1$ is provided with a subsidiary oil pump Ps driven directly by the first output shaft $10_1$. In the embodiment, each of the main oil pump Pm and the subsidiary oil pump Ps is a gear pump, and the capacity of the main oil pump Pm is set slightly greater than that of the subsidiary oil pump Ps. The oil discharged from both oil pumps Pm and Ps is used as a supplement or a replacement of oil in the hydraulic closed circuit 26, generation of control initial pressure for providing control of the pump swashplates 32, the motor swashplates 38 and the like, or lubrication of each part of the hydraulic pump 24 and the hydraulic motor 25.

The operation of this embodiment will now be described.

If the power of the engine E is supplied to the input shaft 9 and hence the carrier 11 through the crankshaft 7 and the torque damper 8, the power is divided by the larger- and smaller-diameter pinion gears 13 and 14, and the power transmitted to the larger-diameter pinion gear 13 is transmitted from the smaller-diameter sun gear 15 to the pump cylinder 28 through the first output shaft $10_1$ to drive the pump cylinder 28.

At this time, if each of the pump swashplates 32 and the motor swashplates 38 is in the state of being tilted at an appropriate angle from the standing position, each of the pump plungers 30 makes one reciprocating motion in the corresponding cylinder bore 29 for each rotation of the pump cylinder 28 with a stroke corresponding to the tilt angle $\alpha$ of the pump swashplate 32, thereby performing a discharge and suction operation. The oil pressure discharged from each of the cylinder bores 29 passes through a higher pressure side of the hydraulic closed circuit 26 of the control panel 27, and is transmitted to the corresponding cylinder bore 35 of the motor cylinder 34 and gives an expansion operation to the corresponding motor plunger 36. As the motor plunger 36 presses the corresponding motor swashplate 38, a rotational component of the resulting reaction causes the motor plunger 36 to rotate the motor cylinder 34. Then, the motor plunger 36, after it has completed its expansion work, is given a retraction operation by the motor swashplate 38, and the oil pressure discharged from the corresponding cylinder bore 35 passes through a lower pressure side of the hydraulic closed circuit 26 and is sucked into the cylinder bore 29 of the pump plungers 30 which performs a suction operation. In this manner, in the hydraulic motor 25, the motor plunger 36 is reciprocatingly moved with a stroke corresponding to the tilt angle $\beta$ of the motor swashplate 38, and the motor cylinder 34 makes one rotation for one reciprocation of the motor plunger 36 and the resulting torque is transmitted to the power collecting shaft 17.

Thus, the respective capacities of the hydraulic pump 24 and the hydraulic motor 25 are determined by the strokes of the corresponding plungers 30 and 36, i.e., the angles $\alpha$ and $\beta$ of the corresponding swashplates 32 and 38, and the transmission ratio of the hydrostatic continuously variable transmission 2 can be continuously controlled by changing the angles α and β of the respective swashplates 32 and 38.

On the other hand, the power transmitted to the smaller-diameter pinion gear 14 is transmitted to the second output shaft 10$_2$ through the larger-diameter sun gear 16, and is further transmitted to the power collecting shaft 17 through the mechanical transmission device 4, i.e., the gears 18 and 19.

In this manner, the power of the engine E is divided into two portions by the power dividing device 3, and either one of the portions reaches the power collecting shaft 17 after it has been reduced in a continuously variable manner by the hydrostatic continuously variable transmission 2, whereas the other portion is transmitted by the mechanical transmission device 4 with high efficiency and similarly reaches the power collecting shaft 17. Accordingly, it is possible to achieve power transmission while providing satisfactory performance of the continuously variable transmission while providing efficient power transmission.

The two portions are combined at the collecting shaft 17, and the obtained power is transmitted to the differential 6 through the reduction gear 5 and is distributed between the left and right wheel drive axles 23$_L$ and 23$_R$ by the differential 6.

The relationship between the tilt angles α and β of the respective swashplates 32 and 38 and a total speed ratio e in the hydraulic and mechanical transmission apparatus T will be described below with reference to FIG. 2.

Figure 2:
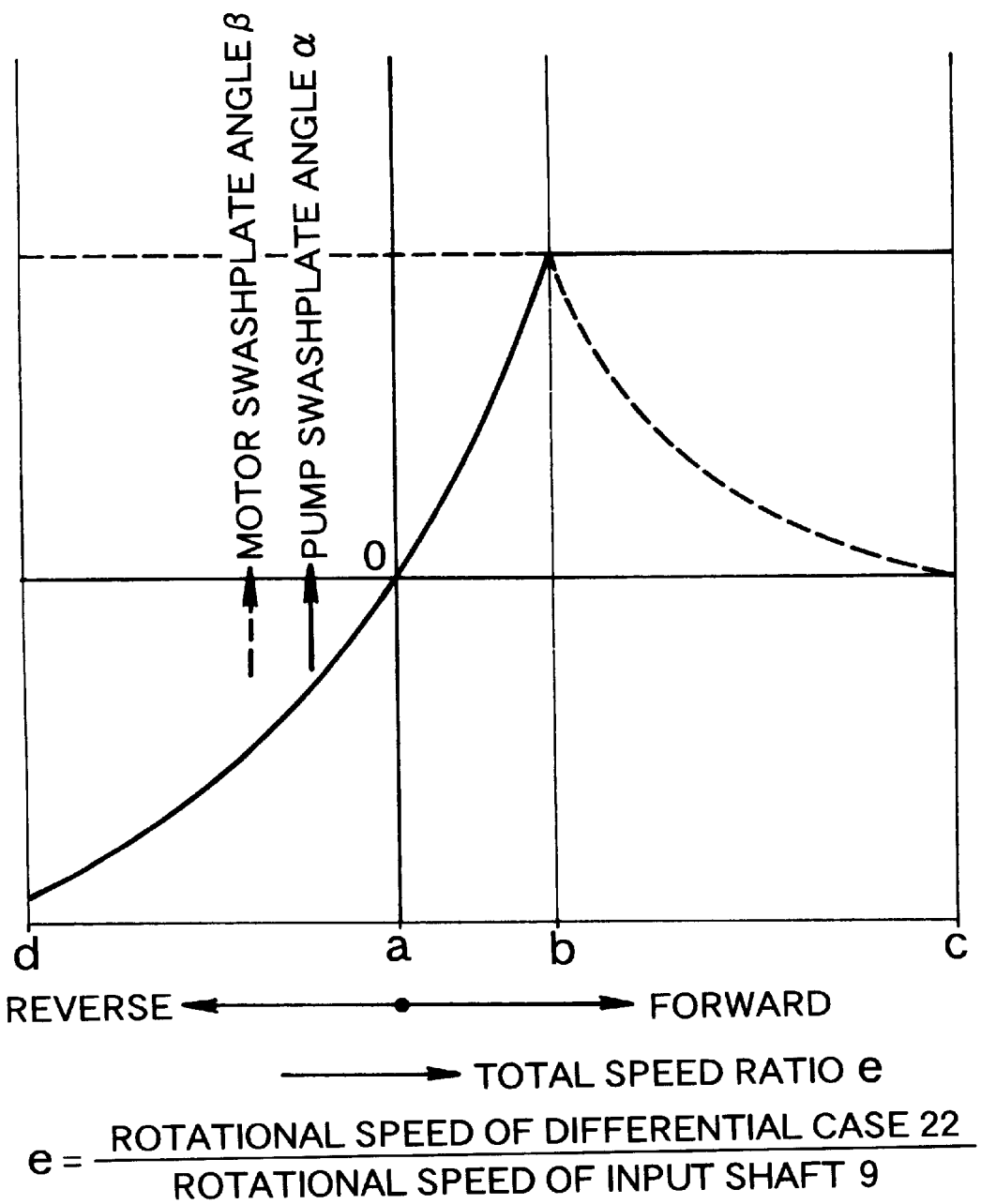

In the graph shown in FIG. 2, the horizontal axis represents the total speed ratio e, and the vertical axis represents the tilt angles α and β of the respective pump swashplate 32 and motor swashplate 38.

(1) Total Speed Ratio e=a

At this time, the pump swashplates 32 are controlled to satisfy α=0, and the motor swashplates 38 are controlled to satisfy β=βmax. The capacity of the hydraulic pump 24 is zero because α=0, and therefore, even if the pump cylinder 28 is driven from the first output shaft 10$_1$, the pump plungers 30 do not perform a stroke operation and cannot generate oil pressure in the hydraulic closed circuit 26, and the hydraulic motor 25 does not operate. Accordingly, all the power of the engine E supplied to the input shaft 9 is consumed by the substantially no-load idling of the pump cylinder 28 and the second output shaft 10$_2$ does not rotate, and hence, the power collecting shaft 17 does not rotate, either. In consequence, the total speed ratio becomes e=0 (reduction ratio: infinity).

(2) Total Speed Ratio e=a-b

In the area a-b, the angle α of the pump swashplates 32 is gradually increased to αmax with the motor swashplates 38 held at β=βmax. Specifically, the capacity of the hydraulic pump 24 increases with an increase in the angle α, and the hydraulic motor 25 is activated according to the increase in such capacity and the transmission of power to the second output shaft 10$_2$ is also initated. Consequently, the total speed ratio e gradually increases.

(3) Total Speed Ratio e=b-c

In the region b-c, the angle β of the motor swashplates 38 is gradually decreased from βmax to zero with the pump swashplates 32 held at α=αmax. Since the capacity of the hydraulic motor 25 decreases with the decrease in the angle β, the rotational speed of the pump cylinder 28 gradually decreases as a result of an increase in the load on the hydraulic pump 24, and the pump cylinder 28 stops at β=0.

In contrast, the rotational speed of the second output shaft 10$_2$ gradually increases, and therefore, the total speed ratio e reaches a maximum at β=0.

(4) Total Speed Ratio e=a-d

In the area a-d, each of the pump swashplates 32 is gradually tilted in a negative direction from α=0, i.e.. from the standing position in a direction opposite to that during a forward movement, with the motor swashplates 38 being held at β=βmax. In this area, since the oil pressure discharge direction of the hydraulic pump 24 with respect to the hydraulic closed circuit 26 is reversed, the relationship between the high pressure side and the low pressure side in the hydraulic closed circuit 26 is the opposite of that during the forward movement and the motor cylinder 34 reverses, and therefore, the wheel drive axles 23$_L$ and 23$_R$ can be reversed.

Figure 3:
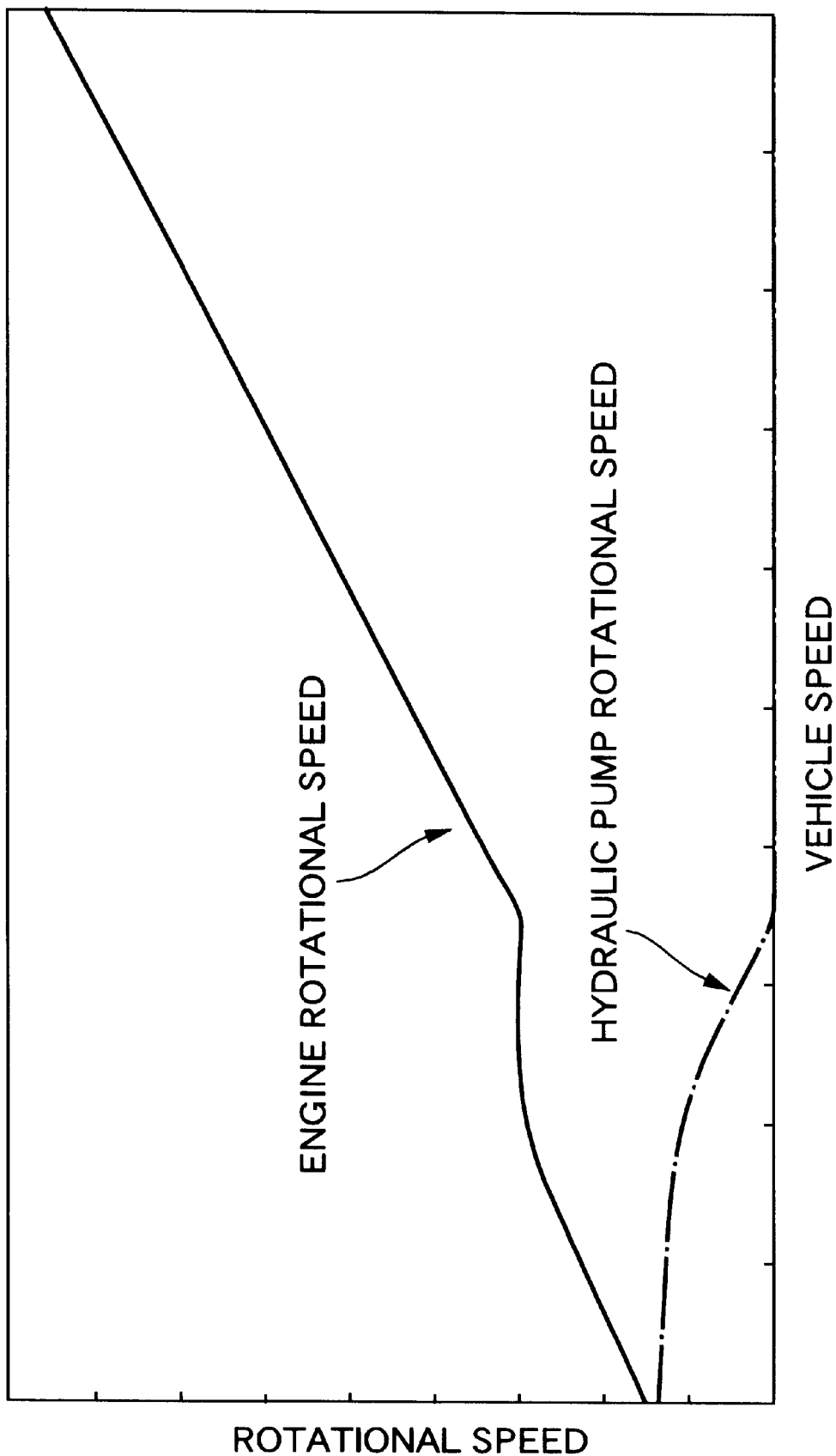

FIG. 3 shows how an engine rotational speed Ne of the engine E and a pump rotational speed Np of the hydraulic pump 24 vary according to a variation in the speed of a vehicle during a forward running of the vehicle. In the first half of the region of the total speed ratio e=a-b, the engine rotational speed Ne increases according to an increase in the vehicle speed, and in the second half, the engine rotational speed Ne is approximately constant with respect to an increase in the vehicle speed. During the region a-b, the pump rotational speed Np gradually decreases toward zero. Then, in the region of the total speed ratio e=b-c, the engine rotational speed Ne linearly increases according to an increase in the vehicle speed, whereas the pump rotational speed Np is held at zero.

The rotational speed of the input shaft 9 connected to the crank shaft 7 of the engine E through the torque damper 8, i.e., the pump rotational speed of the main oil pump Pm provided at the input shaft 9, becomes equal to the engine rotational speed Ne. The pump rotational speed of the subsidiary oil pump Ps provided at the first output shaft 10$_1$, which is the rotating shaft of the hydraulic pump 24, becomes equal to the pump rotational speed Np of the hydraulic pump 24. Accordingly, the characteristics of the respective discharge flow rates of the main oil pump Pm and the subsidiary oil pump Ps with respect to a variation in the vehicle speed become substantially analogous to the characteristics of FIG. 3, as shown in FIG. 4.

Figure 4:
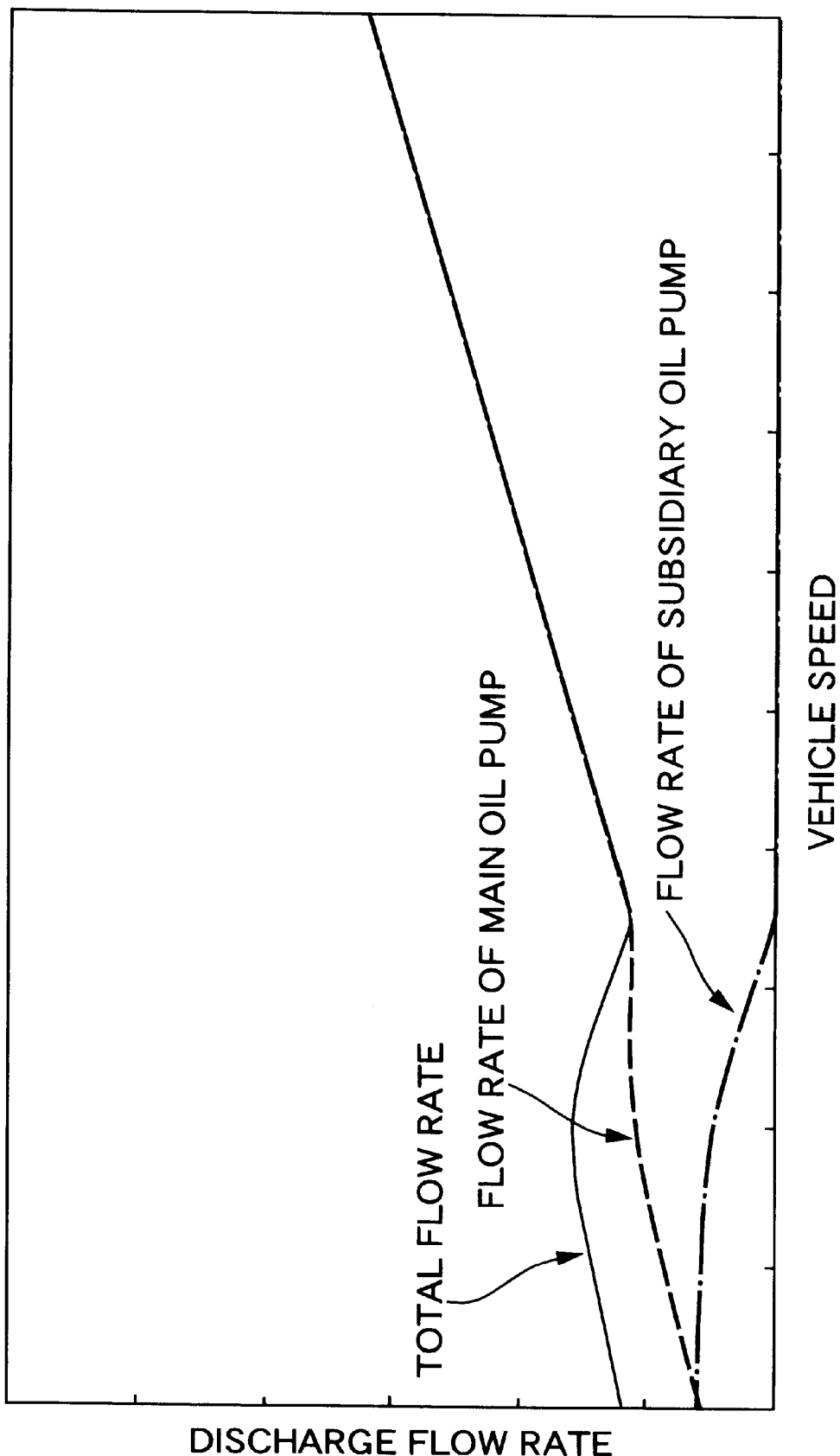

As is apparent from FIG. 4, during a low vehicle speed (particularly, during a starting time of the vehicle) where the required oil quantity cannot be satisfied only by the discharge flow rate of the main oil pump Pm, the subsidiary oil pump Ps is driven to supplement the discharge flow rate of the main oil pump Pm, and therefore, a sufficient oil quantity can be ensured as the total of the discharge flow rates of both oil pumps Pm and Ps. On the other hand, during a high vehicle speed where the required oil quantity can be ensured only by the discharge flow rate of the main oil pump Pm, the subsidiary oil pump Ps ceases operation to prevent an oil quantity larger than necessary from being supplied as the total of the discharge flow rates of both oil pumps Ps and Pm, thereby making it possible to avoid a wasteful energy consumption.

A second embodiment of the present invention will now be described with reference to FIGS. 5 to 7.

Figure 5:
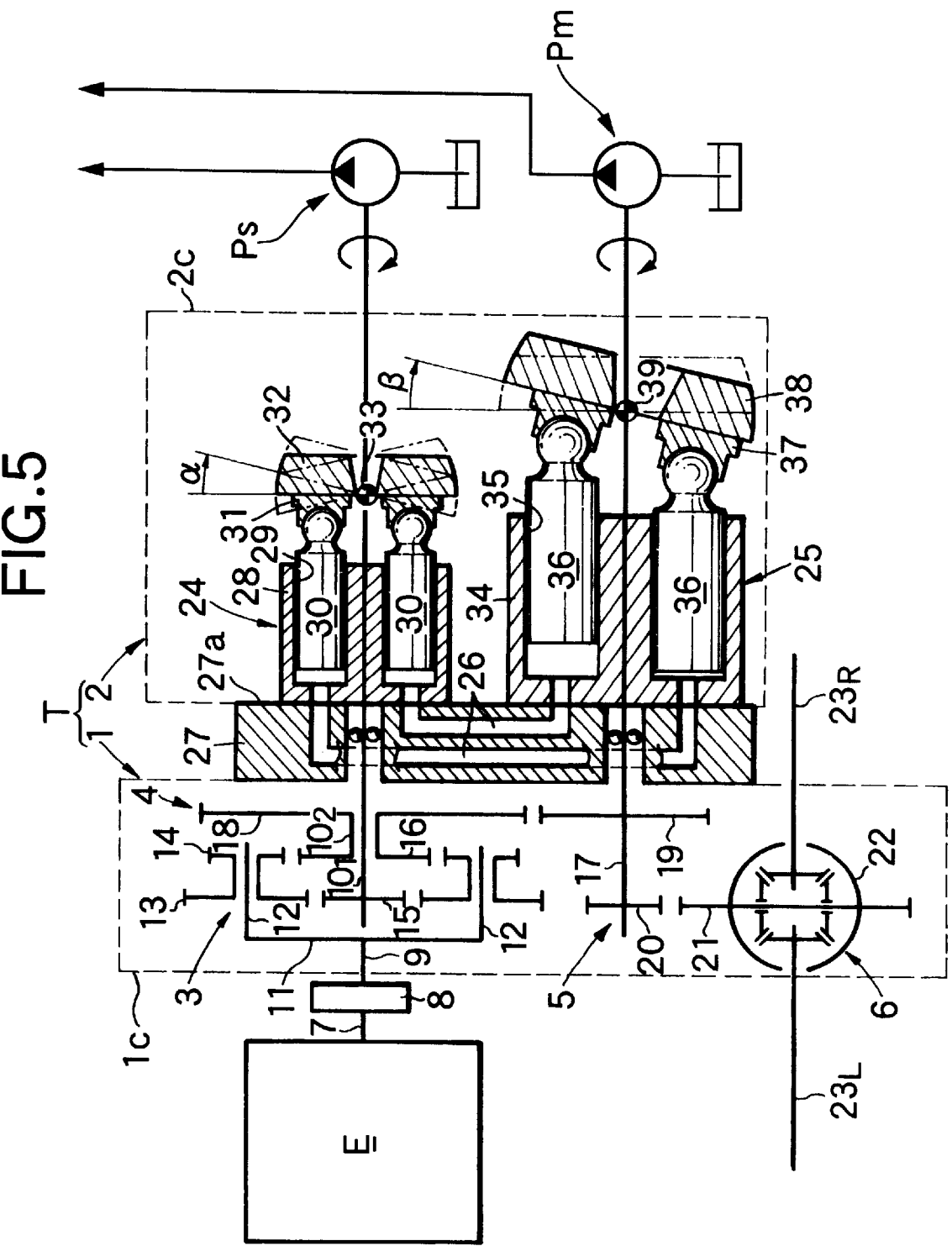

As is apparent from a comparison between FIG. 1 and FIG. 5, the main oil pump Pm is provided at the input shaft 9 in the first embodiment shown in FIG. 1, whereas in the second embodiment shown in FIG. 5 the main oil pump Pm is provided at the power collecting shaft 17 which is the rotating shaft of the hydraulic motor 25. Because the power collecting shaft 17 is connected to the second output shaft 10₂ through the gears 18 and 19, the main oil pump Pm is driven at a pump rotational speed proportional to the rotational speed of the second output shaft 10₂.

Figure 6:
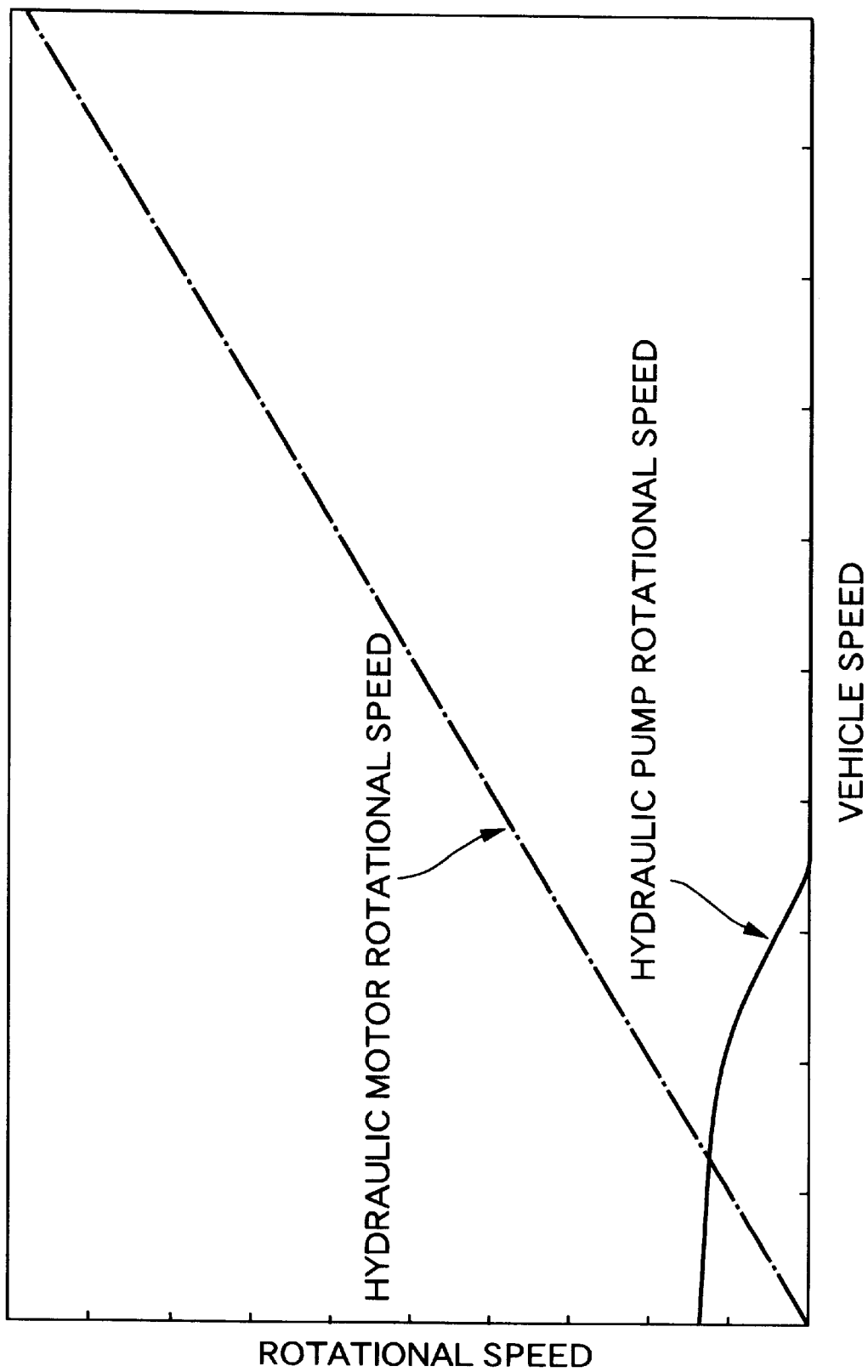

As is apparent from FIG. 6, the power collecting shaft 17 which is the rotating shaft of the hydraulic motor 25 is connected to the differential 6 through the smaller-diameter gear 20 and the larger-diameter gear 21, and therefore, the rotational speed Nm of the hydraulic motor 25 is proportional to the vehicle speed. On the other hand, as in the case of the first embodiment, the rotational speed Np of the hydraulic pump 24 gradually decreases toward zero in the region of the total speed ratio e=a-b, and is held at zero in the region of the total speed ratio e=b-c.

Figure 7:
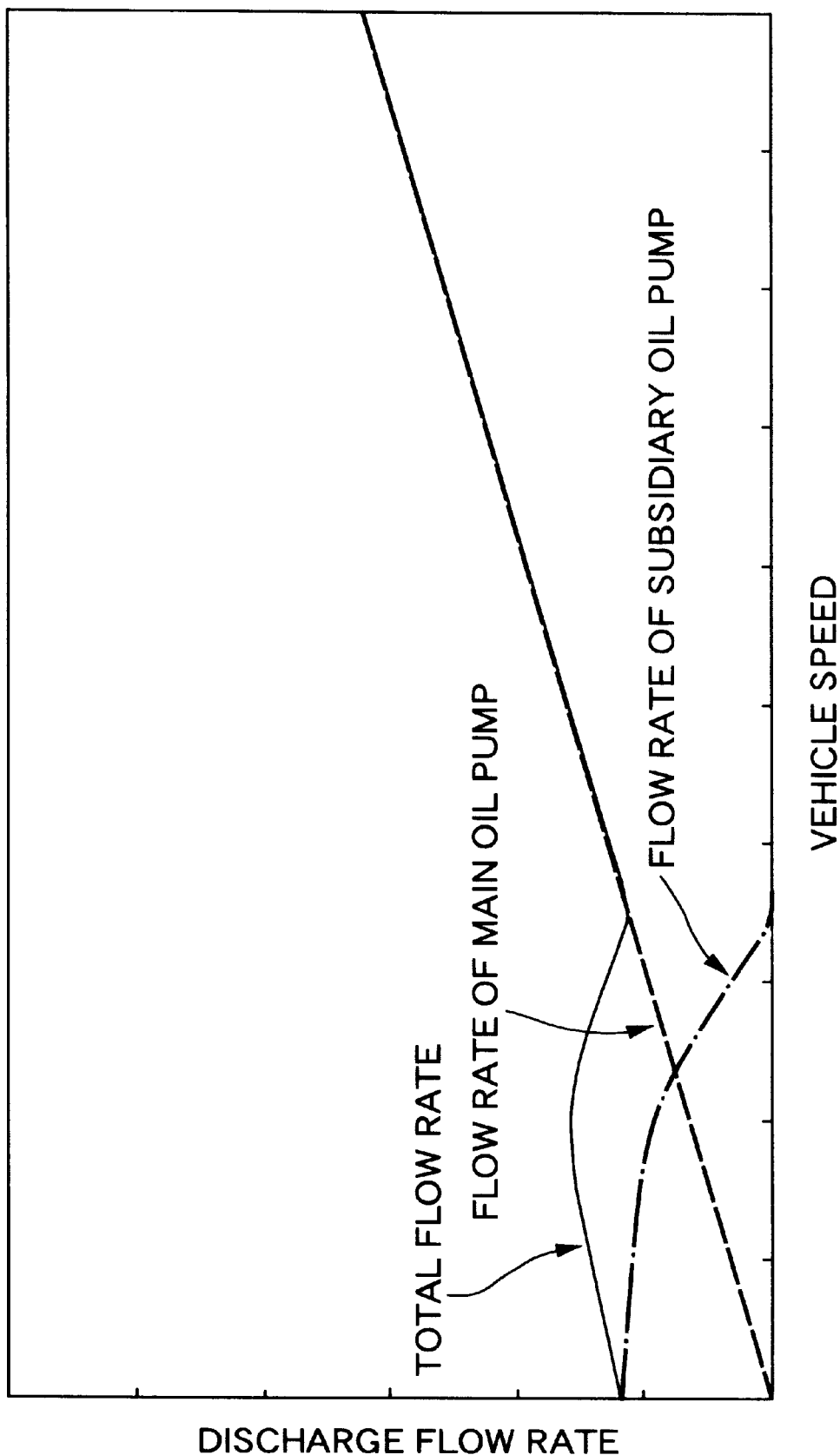

Accordingly, as is apparent from FIG. 7, the discharge flow rate of the main oil pump Pm provided at the power collecting shaft 17 increases in proportion to an increase in the vehicle speed, whereas the discharge flow rate of the subsidiary oil pump Ps provided at the first output shaft 10₁ decreases to zero according to the increase in the vehicle speed. In the second embodiment as well, during a low vehicle speed where the required oil quantity cannot be satisfied only by the discharge flow rate of the main oil pump Pm, the discharge flow rate of the main oil pump Pm is supplemented by the discharge flow rate of the subsidiary oil pump Ps, and during a high vehicle speed where the required oil quantity can be supplemented only by the discharge flow rate of the main oil pump Pm, the subsidiary oil pump Ps is stopped so that wasteful energy consumption can be avoided.

Figure 8:
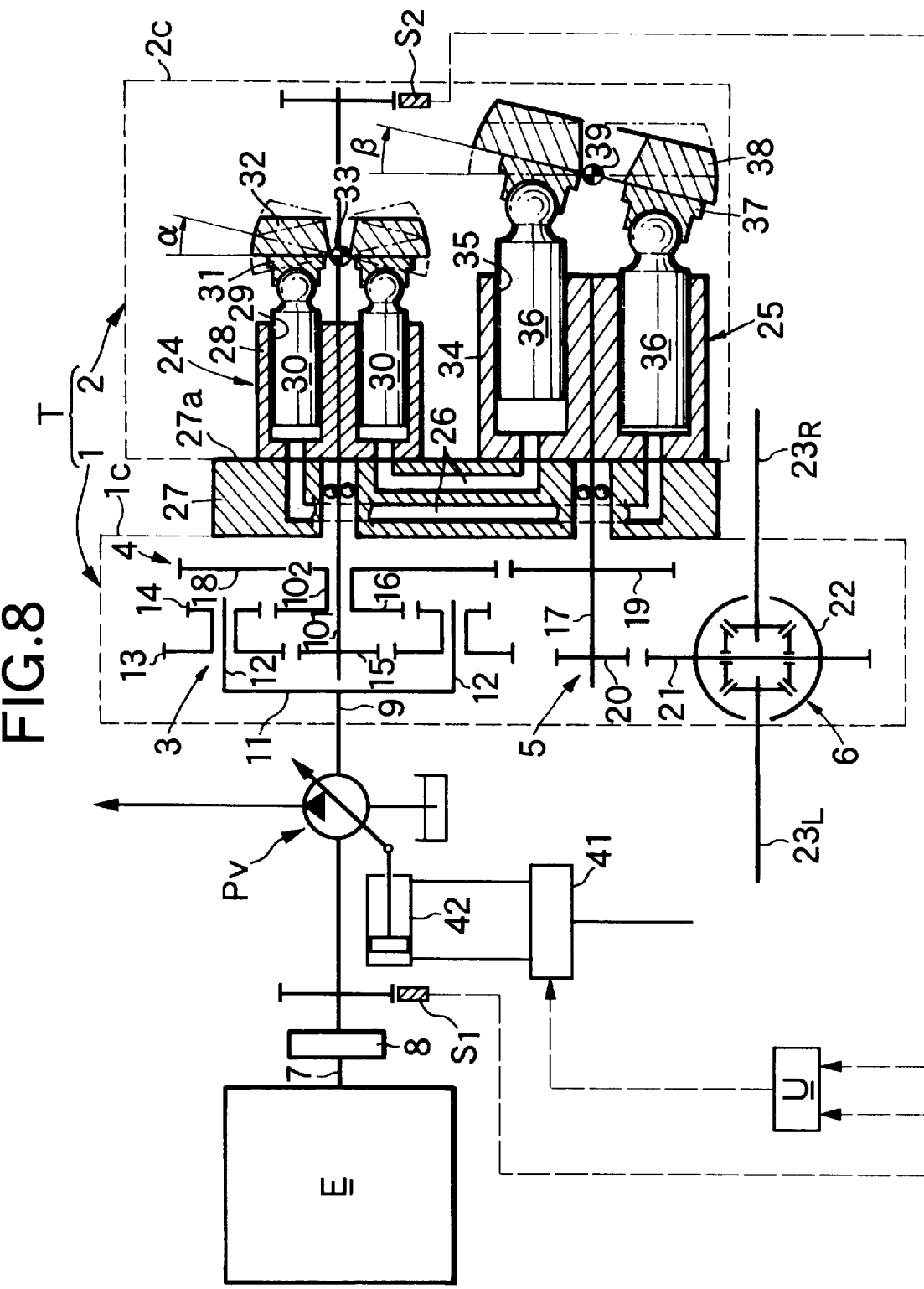

A third embodiment of the present invention will now be described with reference to FIGS. 8 and 9.

The third embodiment is provided with a single variable displacement oil pump Pv driven by the input shaft 9, and this variable displacement oil pump Pv is capacity-controlled by a servo cylinder 42 connected to a control valve 41. An electronic control unit U controls the degree of opening of the control valve 41 on the basis of the rotational speed of the input shaft 9 (i.e., the engine rotational speed Ne) detected by first rotational speed detecting means S₁ and the rotational speed of the first output shaft 10₁ detected by second rotational speed detecting means S₂ (i.e., the pump rotational speed Np of the hydraulic pump 24).

The operation of the third embodiment will be described below with reference to the flowchart shown in FIG. 9. First, in Step S1, the engine rotational speed Ne is detected by the first rotational speed detecting means S₁, and in Step S2, the pump rotational speed Np is detected by the second rotational speed detecting means S₂. Then, in Step S3, a target discharge quantity Q of the variable capacity oil pump Pv is calculated by using the following equation so that the target discharge quantity Q becomes proportional to the engine rotational speed Ne and the pump rotational speed Np:

$$Q = K_1 \times Ne + K_2 \times Np \quad (1)$$

where K₁ and K₂ are preset constants. Then, in Step S4, a control current to be outputted to the control valve 41 is map-retrieved on the basis of the target discharge quantity Q of the variable displacement oil pump Pv, and in Step S6, the control current is outputted to the control valve 41 to drive the servo cylinder 42, thereby controlling the capacity of the variable displacement oil pump Pv.

In the above equation (1), the target discharge quantity Q of the variable capacity oil pump Pv is set to become proportional to the engine rotational speed Ne and the pump rotational speed Np, and therefore, it is possible to obtain discharge flow rate characteristics identical to those shown in the graph of FIG. 4. Specifically, in a low vehicle speed region where the engine rotational speed Ne is low, the discharge quantity of the variable displacement oil pump Pv is set according to both the engine rotational speed Ne and the pump rotational speed Np, and therefore, the supply of a sufficient oil quantity is possible. In addition, in a high vehicle speed region where the engine rotational speed Ne is high, since the pump rotational speed Np becomes zero, the discharge quantity of the variable displacement oil pump Pv is set according to only the engine rotational speed Ne, and wasteful energy consumption is avoided.

Although the embodiments of the present invention have been described above, various design changes may be made without departing from the scope and spirit of the invention.

For example, the power dividing device 3 is not limited to the planetary gear type and may be of another type. The mechanical transmission device 4 may also be constructed of a chain or belt transmission. The engine E may be replaced with an electric motor. The main oil pump Pm, the subsidiary oil pump Ps and the variable displacement oil pump Pv are not limited to gear pumps, and may be replaced with other kinds of pumps such as a trochoid pump, a vane pump and a piston pump.

What is claimed is:

1. A hydraulic and mechanical transmission apparatus comprising:

an input shaft;

a first output shaft;

a second output shaft;

a power dividing device for dividing power inputted from a prime mover to said input shaft into a plurality of portions and transmitting the respective portions to said first and second output shafts;

a hydrostatic continuously variable transmission including a hydraulic pump driven by power outputted from said first output shaft, a hydraulic motor which communicates with said hydraulic pump through a hydraulic closed circuit, and a control panel in which said hydraulic closed circuit is formed, wherein at least one of said hydraulic pump and said hydraulic motor has a variable displacement construction;

a mechanical transmission device connected to said second output shaft, a power collecting shaft for collecting power respectively outputted from said mechanical transmission device and said hydraulic motor and supplying the collected power to a load; and oil supplying means for providing a supplement of oil to at least said hydraulic closed circuit, wherein said hydraulic and mechanical transmission apparatus has a characteristic which allows a rotational speed of said first output shaft and a rotational speed of said second output shaft to decrease and increase, respectively, with an increase in a rotational speed of said input shaft, and wherein said oil supplying means includes a first oil pump having a discharge flow rate that is proportional to the rotational speed of one of said input shaft and said second output shaft and a second oil pump having a discharge flow rate that is proportional to the rotational speed of said first output shaft.

2. A hydraulic and mechanical transmission apparatus according to claim 1, wherein said first oil pump is driven by one of said input shaft and said second output shaft, and said second oil pump is driven by said first output shaft.

3. A hydraulic and mechanical transmission apparatus according to claim 1, wherein said first oil pump is a main oil pump driven at a rotational speed proportional to the rotational speed of said input shaft and said second oil pump is a subsidiary oil pump driven at a rotational speed proportional to the rotational speed of said first output shaft.

4. A hydraulic and mechanical transmission apparatus according to claim 1, wherein said first oil pump is a main oil pump driven at a rotational speed proportional to the rotational speed of one of said input shaft and said second output shaft and said second oil pump is a subsidiary oil pump driven at a rotational speed proportional to the rotational speed of said first output shaft.

* * * * *